Figure 1:
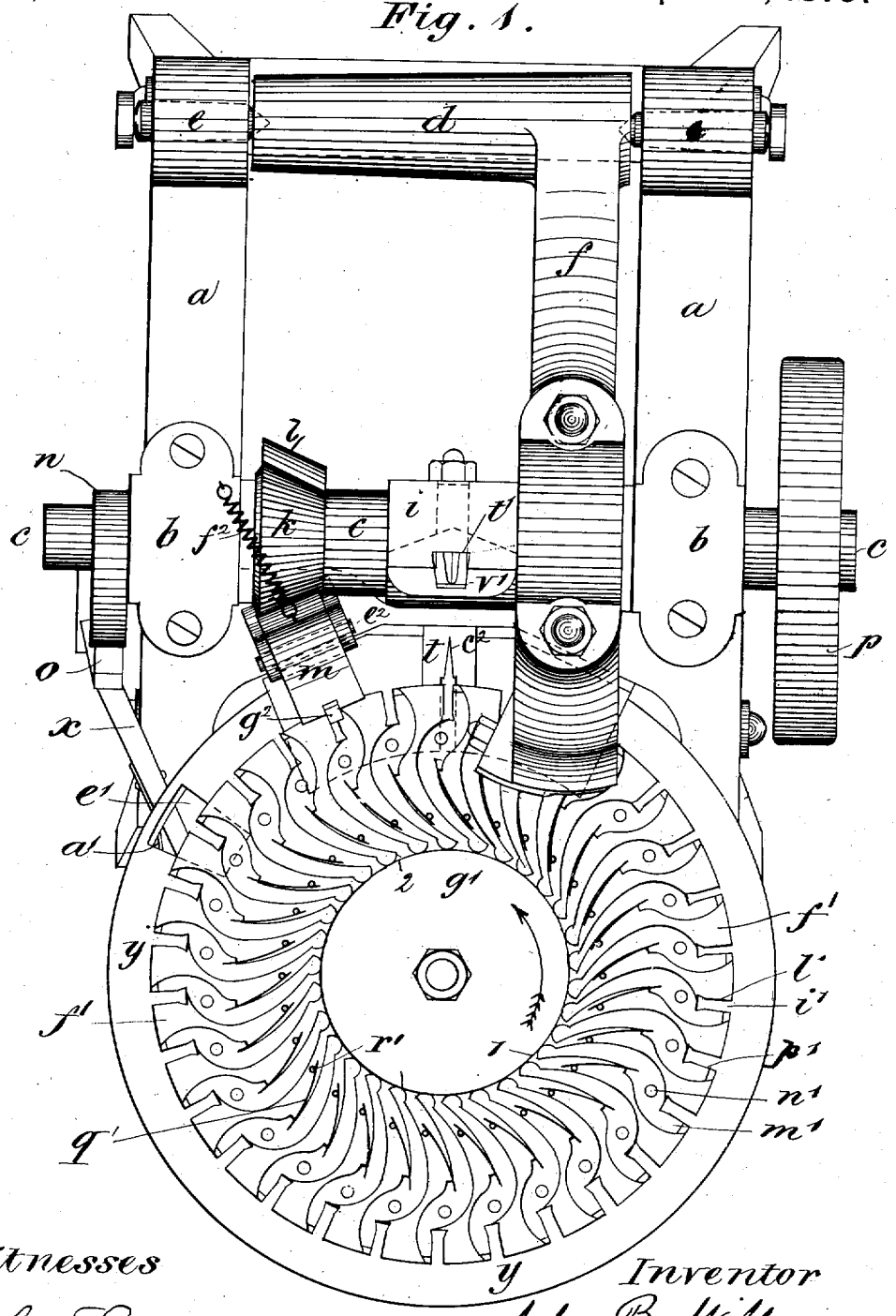

5 Sheets—Sheet 1.

J. B. WILLS,

Assignor to W. M. MOONEY & CO.

Machine for Finishing Horseshoe-Nails.

No. 8,673. Reissued April 15, 1879.

Witnesses

A. Simpson

W. E. Fudger

Inventor

John B. Wills per Charles G. C. Simpson

Attorney

J. B. WILLS,

Assignor to W. M. MOONEY & Co.

Machine for Finishing Horseshoe-Nails.

No. 8,673. Reissued April 15, 1879.

Witnesses

A. Simpson

W. E. Rudger

Inventor

John B. Wills.

per Charles G. C. Simpson

Atty

Attorney

J. B. WILLS,

Assignor to W. M. MOONEY & Co.

Machine for Finishing Horseshoe-Nails.

No. 8,673. Reissued April 15, 1879.

Witnesses

A. Simpson

W. E. Rudger

Inventor.

John B. Wills per

Charles G. G. Simpson

Attorney

J. B. WILLS,

Assignor to W. M. MOONEY & Co.

Machine for Finishing Horseshoe-Nails.

No. 8,673. Reissued April 15, 1879.

Witnesses

A. Simpson

W. E. Fudger

Inventor

John B. Wills per

Charles G. C. Simpson

Attorney

J. B. WILLS,

Assignor to W. M. MOONEY & Co.

Machine for Finishing Horseshoe-Nails.

No. 8,673. Reissued April 15, 1879.

Witnesses

A. Simpson

W. E. Fudger

Inventor

John B. Wills per

Charles G. C. Simpson

Attorney

UNITED STATES PATENT OFFICE.

JOHN B. WILLS, OF KEESEVILLE, ASSIGNOR TO W. M. MOONEY & CO., OF AUSABLE CHASM, NEW YORK.

IMPROVEMENT IN MACHINES FOR FINISHING HORSESHOE-NAILS.

Specification forming part of Letters Patent No. 175,891, dated April 11, 1876; Reissue No. 8,673, dated April 15, 1879; application filed October 30, 1878.

*To all whom it may concern:*

Be it known that I, JOHN BOWMAN WILLS, of the village of Keeseville, in the county of Essex, in the State of New York, have invented certain new and useful Improvements in Machines for Finishing Horseshoe-Nails; and I do hereby declare that the following is a full, clear, and exact description of the same.

This invention provides a machine for treating blanks which are to be formed into horseshoe-nails, the blanks having had, by any suitable mechanism, their heads and bodies brought to the desired configuration in thickness and width, and requiring only to have any improper bends or crooks taken out of them, and their ends cut and pointed to give the points the desired finish to form perfect nails. The machine, therefore, has a threefold action, and, after the blanks have been fed to it, first presses out of them any improper bends or crooks, bringing them on the "flat" to the required form or shape. The machine next shears or cuts the points to the exact required shape sidewise, and, lastly, it bevels the extremities of the points, all of which actions will be more clearly hereinafter described.

In the drawings hereunto annexed similar letters of reference indicate like parts.

Figure 2:
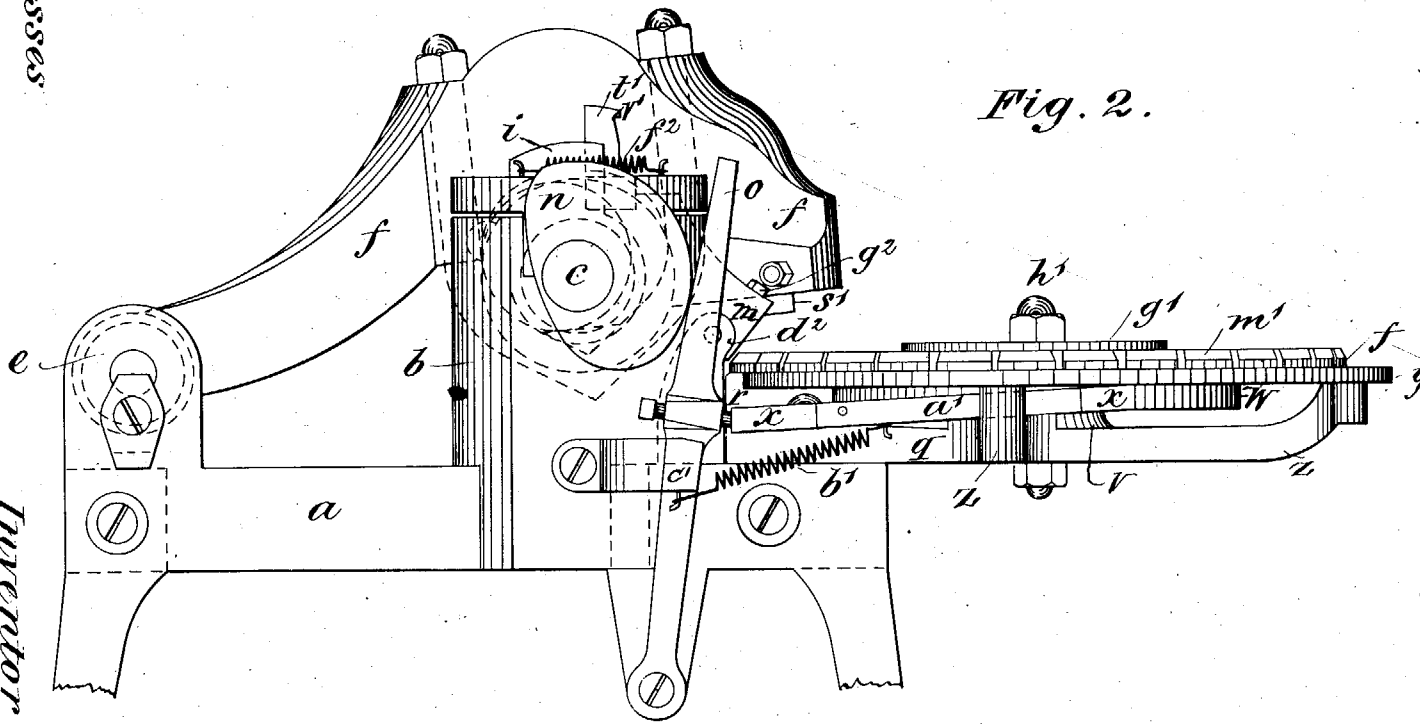
Figure 3:
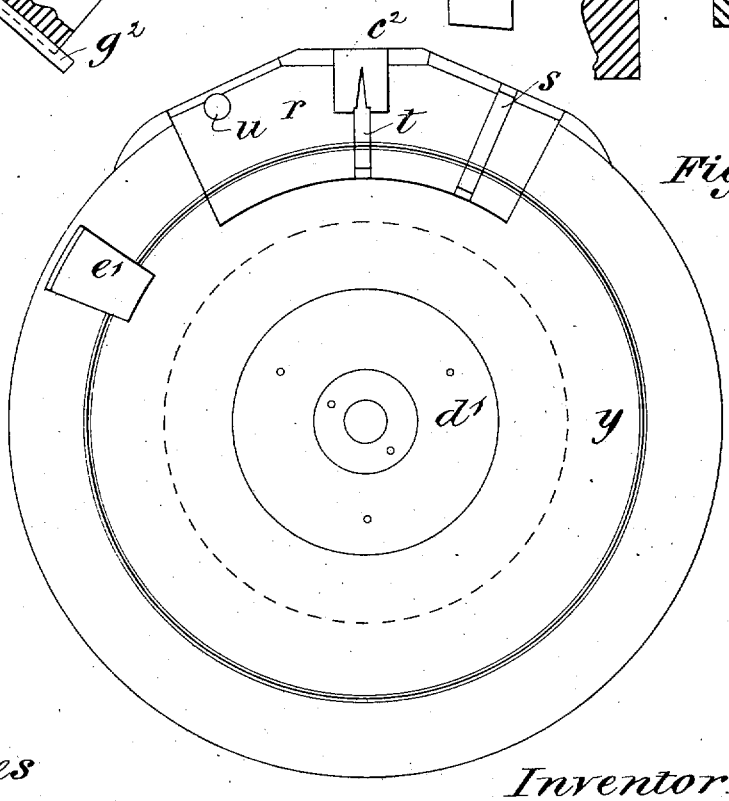
Figure 8:
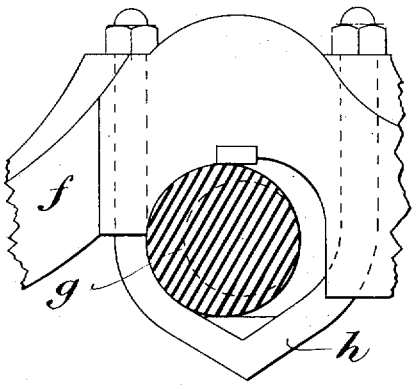
Figure 9:
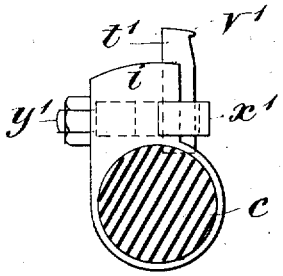
Figure 10:
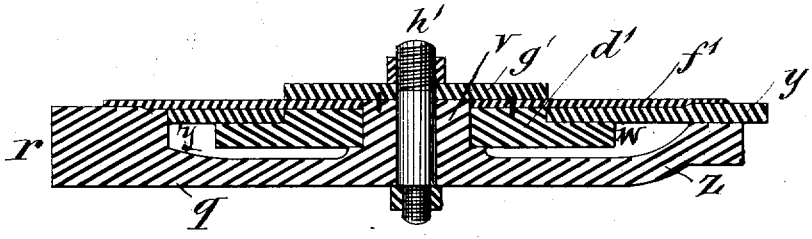
Figure 12:
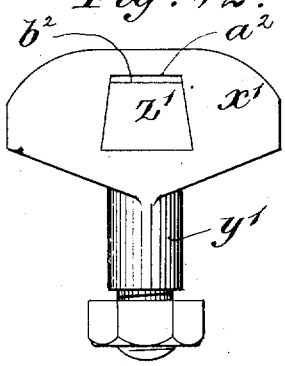
Figure 11:
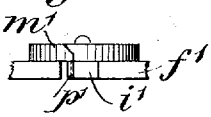
Figure 13:
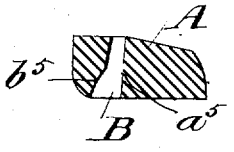
Figure 14:
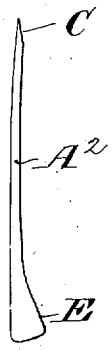
Figure 15:
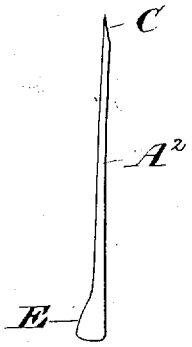
Figure 16:
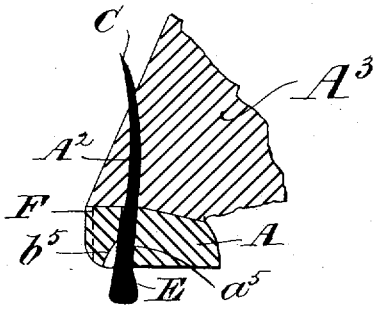
Figure 17:
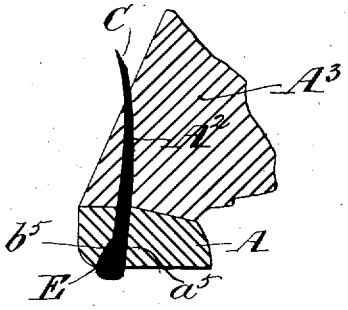

Figure 1 is a plan of a machine embodying my invention. Fig. 2 is a side elevation of the machine. Fig. 3 is a detail plan. Figs. 4, 5, 6, and 7 are details of dies. Fig. 8 is a detail of arm and cam. Fig. 9 is a detail of projection and dies. Fig. 10 is a sectional detail of revolving plate, with parts thereto relating, the fingers being, however, omitted. Fig. 11 is a detail, showing in elevation a portion of the revolving plate, with a finger attached. Fig. 12 is a detail of the staple for holding the dies shown in Fig. 6. Fig. 13 is a section of a horseshoe, showing the crease where the nail passes through. Fig. 14 is an elevation of the nail as commonly made. Fig. 15 shows another form of nail. Fig. 16 shows the nail as commonly made, applied to a shoe and hoof. Fig. 17 shows the other form of nail as applied to a shoe and hoof.

Letter *a* is any suitable frame-work for holding the moving parts in their proper relative positions. *b b* are plumber-blocks, preferably made integral with the bed *a*, for carrying the revolving shaft *c*. *d* is a shaft held between centers in the projections *e* of the frame *a*. To this shaft an arm, *f*, is attached or made integral with it. The arm is of the configuration shown clearly in Figs. 2 and 8, being provided with a strap, *h*, to engage with or be acted upon by the eccentric *g*, preferably made integral with the shaft *c*, which revolves within the space formed between the strap and arm, and thus raises and depresses the arm.

*i* is a projection on the shaft *c*, preferably integral therewith, and of the form clearly shown in Figs. 1, 2, and 9. To this projection are attached dies, hereinafter described. *k* is an enlargement of the shaft *c*, made for the purpose of accommodating the relative position of the die-carrier *m*, and provided with a cam-projection, *l*, for actuating the die-carrier. *n* is a cam formed on one end of the shaft *c*, for the purpose of actuating a lever, *o*. *p* is a pulley and balance-wheel, to rotate the shaft *c*, it being connected therewith in the ordinary manner.

To the front of the frame *a* is attached a sub-frame, *q*, a part of which forms a bed, *r*, for the dies *s*, *t*, and *u*. *v* is a central hub integral with the frame *q*, on which is placed a wheel, *w*, provided with ratchet-teeth. This wheel is operated by the action of the cam *n* of the shaft *c* upon the lever *o*, which, in its turn, operates the pawl-bar *x*, the parts being arranged so that one revolution of the shaft *c* will cause the wheel *w* to advance or rotate the amount of one of the teeth of the wheel. *y* is an annular plate carried on arms *z* of the frame *q*. These arms *z* are three in number. One extends to the front, as shown in Figs. 2 and 10, and two extend to the sides, only one of which appears in Fig. 2; but it will be easily understood that there is another one on the opposite side.

As shown in Fig. 2, the pawl-bar *x* is carried on one of the arms *z*. The pawl carried by said bar is forced up to engage with the teeth of the wheel *w* by a spring, $a^1$, pressing on its back. The bar is also caused to retire by means of a spring, $b^1$, attached at one end to the said pawl-bar *x* and at the other end to the guide $c^1$, which retains the lever *o* in its proper position on the face of the cam $n$. This guide $e^1$ consists of a simple bracket bolted to the frame $a$.

Returning to the annular plate $y$, the opening in the center of it is made to fit a projection, $d^1$, on the upper side of the wheel $w$, so that the wheel can freely revolve within it. It will also be observed in Fig. 10 that the surface on the upper side of the projection $d^1$ comes fair with the surface of the annular plate $y$, and in Fig. 3 it will be seen that a piece is cut out of the annular plate $y$ to fit about the bed $r$. Another opening, $e^1$, is made in the annular plate $y$ for the nails to fall through, as will hereinafter be more clearly described.

Upon the surface formed by the upper side of the projection $d^1$ and annular plate $y$ is laid a circular plate, $f^1$, agreeing with the configuration of the surface, and having an opening fitting upon the hub $r$. By this arrangement of the parts it will be seen that the central portion of the circular plate $f^1$, on its under side, and the upper surface of the projection $d^1$ of the wheel $w$ come together. They are, furthermore, attached by dowel-pins, screws, or other devices to oblige the plate and wheel to revolve together. It will be observed that the upper surface of the plate $y$ and the lower surface of the plate $f^1$ agree with one another, as shown in Fig. 10.

On the upper surface of the hub $v$ is attached by dowel-pins or screws, keeping it stationary with the hub, a cam-plate, $g^1$. $h'$ represents a bolt and nuts passing through the hub and cam-plate, and further securing all the parts together. Thus it will be seen that the parts $y$ and $g^1$ are stationary, while the wheel $w$ and plate $f^1$ revolve. The plate $f^1$ is provided with radial slots $i^1$, extending all around it at equally-distant intervals in the circle. Their number and the number of the teeth of the wheel $w$, before described, will agree. The slots are, furthermore, configurated to have one side, $l'$, agree with one side of the head of the nail-blank and the adjacent half of the body, the other side of the slot being sufficiently cut out to receive a projection or lip $p'$ of the finger, (shown in Fig. 11,) which projects downward the depth of the plate $f^1$.

$m'$ are finger-pieces or levers, pivoted at $n'$ to the plate $f^1$, and of the configuration shown, having their lips $p'$ configurated to agree with the opposite sides of the heads and bodies of the nail that the sides $l'$ agree with, so that nails can be freely laid in the openings existing between the lips $p'$ and sides $l'$, the fingers being rotated on their pivots and caused to close upon the nails by their other extremities acting on the edge of the cam-plate $g^1$.

It will be seen in Fig. 1, by the formation of the cam $g^1$, that the action of the fingers $m'$ (to gripe nails laid in the slots $i'$) is continued throughout the portion of the periphery of the cam from the point 1 to the point 2 on the side on which the arrow is drawn, which arrow also indicates the direction of the revolution of the plate $f^1$, while throughout the remainder of the periphery the configuration of the cam allows the fingers to be retired from contact with the nails by a spring, $q'$, attached on each of their backs, and pressing against suitable stops $r'$.

It will furthermore be observed that the point 2 above referred to occurs a little in advance of the arrival of the nail at the opening $e^1$, so that a nail that has been griped throughout the portion of the circle above described will be free to fall through the opening when it arrives at it.

It will be seen by the action of the pawl-bar $x$, operated by lever $o$ and cam $n$, that the plate $f^1$ is made to rotate the amount of from one slot $i'$ to the other at each revolution of the shaft $c$; and it will be also seen that, by reason of the configuration of the cam $n$, this is not a continuous motion, the plate rotating as the pawl-bar is pushed forward and remaining stationary as it retires, thereby enabling nails to be introduced in the slots while the levers are in contact with the lower part of the circle of the cam.

In situating the dies $s$, $t$, and $u$ in the bed $r$, I so place them that they exactly agree with the positions of the slots $i'$ when the plate $f^1$ is at rest. They may be placed, as shown in the drawings, with one slot $i'$ intervening between each die, or with a greater number so intervening.

Figure 5:
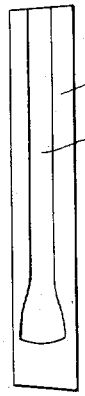
Figure 4:
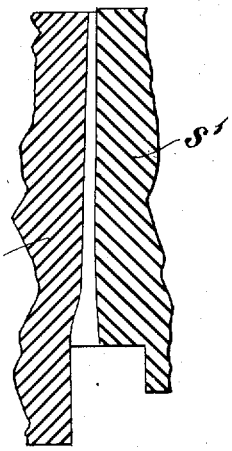

The die $s$ is shown more clearly in section on an enlarged scale in Fig. 4, and in plan, Fig. 5, where the nail-blank is also delineated as lying upon it. Its upper surface agrees exactly with the proper configuration of the nail.

$s'$ is a die attached to the end of the arm $f$ in a suitable position to come down upon the nail-blank lying upon the die $s$ in the position shown in Fig. 5, its plan being the same, or nearly the same, as the plan of the nail-blank, the parts being so arranged that when a nail-blank is held in position by one of the fingers $m'$ on the die $s$, the die $s'$ comes down upon the said nail-blank with sufficient force to press out any crooks or bends that may improperly exist in it, but not to crush or extend the blank in any way. The cam $g$ on the shaft $c$ is arranged or timed to bring down the die $s'$ during the interval that the plate $f'$ is at rest, as hereinbefore described.

Figure 6:
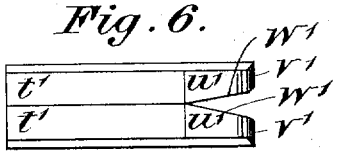

The dies $t'$, attached to the projection $i$ on the shaft $c$, are shown in end view, Fig. 1, a part side view, Fig. 2, a complete side view in Fig. 9, and in under plan in Fig. 6. They are made in two parts, the inner sides doweled together throughout their bodies, while their ends $u'$ are cut away, leaving an acute V form, as seen in Fig. 6, being the exact form that the ends of the blanks require to be cut down to, less a slight allowance for the oblique action of the cut. They are also cut away on their upper sides, giving them an amount of clearance.

The extremities of the ends $u'$ are also provided with projections $v'$, which come first in contact with the blank, and prevent any tendency of escape or displacement of it, being slightly beveled off before the cutting-edges, so that they enter upon the blank and bring it to the proper position, should it be slightly out, just before the cutting-edges begin to operate. These cutting-edges are shown clearly at $w'$ in Fig. 6.

The manner of attaching these dies to the projection $i$ is as follows: In the projection a horizontal recess is cut to receive a staple, $x'$, of the configuration shown in Fig. 12, and a hole is bored at the bottom of the recess for the end $y'$ to pass through and receive a nut on its screwed portion for tightening up the staple. This staple is made a very snug fit in the recess in projection $i$ to receive it, so that it cannot shake or twist about. It is provided with an opening, $z'$, to receive the dies $t'$. This opening is inclined, to agree with the outer inclined sides of the dies $t'$, and is of such size that the dies will not come to the bottom $a^2$, but will come to about the position of the line $b^2$. Thus the tighter the nut is screwed upon the end $y$ the tighter the two dies $t'$ are drawn together, and are also drawn up in their recessed bed in the projection $i$.

The die $t$, being the punch or bed die of the dies $t'$, is provided with an upper surface, the section of which would be exactly like the section of the die $s$ in Fig. 4. Its point is exactly in plan the size and shape of the nail, but is sufficiently small not to engage with the cutting-edges $w'$ in Fig. 6 and injure them. The dies $t'$, as will be clearly understood, revolving with the shaft $c$, bring down their ends $u'$ on each side of the end of the point $c^2$ of the die $t$, paring or cutting off the portions of the blank extending beyond the said point $c^2$.

It will be seen that the center of the shaft $c$ is raised at a considerable height above the level of the die $t$ and nail thereon held. The dies are thus enabled to give a drawing cut from the body toward the extremity of the point, in contradistinction to a dead shear cut, which would be the case if the edges $w'$ of the dies $t'$ and the point $c^2$ of the die $t$ came together in a straight line in any portion of the revolution of the dies $t'$. By this oblique action of the dies upon the nail a slight amount of bevel is given to the sides and end of the point, which could not be given by dies coming down fairly or vertically upon the nail with a dead shear. This amount of bevel is of considerable importance in the action of the next dies about to be described.

The dies $t'$ are timed in their action to cut the blank while the plate $f^1$ is stationary.

The die-carrier $m$ is attached by a pivot, $e^2$, to a bracket, $d^2$, made integral with or attached to the frame $a$. Its upper end rests against the projection $k$ of the shaft $c$, and the carrier is rotated on its pivot $e$ by the cam-projection $l$, and is caused to return by a spring, $f^2$. Thus, by the revolution of the shaft, a nodding action is given to the carrier, the parts being situated so that the die $g^2$, secured in the carrier, will come down over the die $u$ in the bed $r$, in the manner clearly shown in Fig. 7, thereby pressing and finishing the extreme point of the nail to any desired chamfer, bevel, or angle, which may be determined by the configuration given to the bottom face of the die $g^2$.

As the extremity of the point is compressed it is slightly widened or enlarged by the action of this die, but only to a sufficient amount to compensate for the beveling cut made by the dies $t'$, as before described, and said to be of considerable importance, so that between the two a beautifully finished and perfect point is obtained.

It will be observed that the pivot $e^2$ is placed at a considerable angle above the end of the die $g^2$.

The action of the die $g^2$ on the nail is not merely a compression, but a compression combined with a draw or rub of the die upon the point, giving a tendency to elongate rather than to widen.

The die $g^2$, like the others above described, is timed to act when the plate $f^1$ is at rest. It will therefore be seen that the nails fed to the slots $i'$ in the plate $f^1$ are first griped by the fingers $m'$, and are carried forward and presented to the action of the dies $s$ $s'$, then carried forward and similarly presented to the action of the dies $t$ $t'$, and, lastly, presented to the action of the dies $u$ and $g^2$. The nails arriving at the opening $e^1$, being released as hereinbefore described, fall out of the machine.

Fig. 13 shows a section of the horseshoe A, with the crease B, as it is always made.

It will be observed that the crease is made with a perpendicular, or nearly perpendicular, side, $a^5$, on the inside of the shoe, while the outside of the crease $b^5$ is very considerably curved.

It will be observed in Fig. 14 that the bevel of the point C and projecting thickness of the nail-head E are made to the one side of the nail $A^2$. When this nail comes to be applied to the shoe, as shown in Fig. 16, the bevel C must be turned to the inside of the hoof, so that as the nail is driven through the hoof the bevel C throws the point outward, and causes it to come through the side of the hoof $A^3$ at the desired point. I say "must," because if the bevel were set the reverse way the point would turn inward instead of outward, and a serious damage would be done to the horse by the nail pricking the foot.

Now, by examination of Figs. 14, 15, and 16 the projection of the head is set exactly the wrong way in Figs. 14 and 16 to what it should be to enable it to fit fairly in the crease of the shoe.

In Fig. 16 it is represented as driven in, but requiring the last stroke or strokes of the hammer to drive it home to a bed in the recess; but to do this it is quite evident that the nail must be bent at the point where the body of the nail and the head unite. This often injures the fiber or structure of the iron or steel of which the nail is formed to such an extent that it either breaks the nail at the time or causes it very shortly afterward to break. Nor is this the only injury entailed. If the edge of the shoe and the edge of the hoof are placed fair when the first nail is driven, as shown in Fig. 16, by the time the nail is driven home the shoe is moved bodily out of place, as indicated by the dotted line F, thereby requiring the shoe to be driven back to the place it was formerly in. The hoof has to yield to this, as the shoe is the harder of the two, and the hole in the hoof made by the nail has to be enlarged to enable the shoe to move over. This loosens the nail and partly destroys its hold in the hoof, as well as injures the hoof. Each nail, when driven, has an inclination to move the shoe in a different direction, and if it does not do this it is because it tears or squeezes an enlarged hole in the hoof.

By making the head of the nail the reverse way, as shown in Fig. 15, it exactly fits the crease, and no inclination to move the shoe is experienced. It also perfectly fills the recess or crease, as clearly shown in Fig. 17, without any bending for that purpose taking place during the driving home of the nail.

Figure 7:
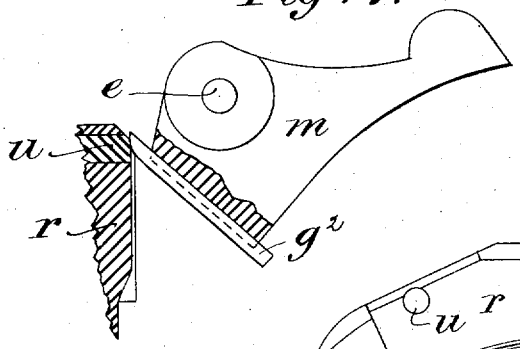

The nail made with the head the reverse way is clearly shown in Fig. 7. By this it will be seen that by reversing the projection of the head of the nail, or reversing the head of the nail to the opposite side of the body and point, the crease in the shoe and the head of the nail are reconciled to an exact fit, it being understood that the two will be configurated for that purpose without any bending of the nail taking place when the nail is driven home, thus overcoming the above-mentioned objections.

What I claim is as follows:

1. The combination of the dies $t'$ and bed-die $t$, arranged to act obliquely, as described, with the dies $g^2$ and $u$, whereby the beveled cut of the former compensates for the widening or enlarging caused by the latter, substantially as described.

2. The revolving plate $f^1$, having openings or slots $i'$, in combination with the fingers $m'$, having lips $p'$, substantially as and for the purposes set forth.

3. The combination of the revolving plate $f^1$ and fingers $m'$, holding the nail-blank throughout a portion of the movement of said plate, with the three sets of dies $s\ s'$, $t\ t'$, and $u\ g^2$, substantially as described.

Keeseville, 25th day of October, A. D. 1878.

JOHN B. WILLS.

Witnesses:

GEO. E. BREWER,

H. P. BLINN.